United States Patent Office 3,163,657
Patented Dec. 29, 1964

3,163,657
PROCESS FOR THE OXIDATION OF PARTIALLY HYDROGENATED POLYCYCLIC AROMATIC AND HETEROCYCLIC COMPOUNDS
Marcus S. Morgan, Mount Lebanon Township, Allegheny County, Albert W. Simon, White Oak Borough, and Myron H. Wilt, Monroeville Borough, Pa., assignors to United States Steel Corporation, a corporation of New Jersey
No Drawing. Filed June 13, 1962, Ser. No. 202,069
12 Claims. (Cl. 260—335)

The present invention relates to the oxidation of partially hydrogenated polycyclic aromatic and heterocyclic compounds. More particularly, the invention is directed to an improved oxidative process for preparing:

Anthraquinone from 9,10-dihydroanthracene.
Anthraquinone from anthrone.
1 - methylanthraquinone from 1 - methyl - 9,10 - dihydroanthracene.
2 - methylanthraquinone from 2 - methyl - 9,10 - dihydroanthracene.
Xanthone from xanthene.
5,12-tetracenequinone from 5,12-dihydrotetracene.

In general, this invention comprises passing a gas containing molecular oxygen into a solution of a partially hydrogenated polycyclic aromatic or heterocyclic compound having the structure:

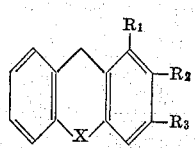

where when $R_1$, $R_2$ and $R_3$ are hydrogen, then X is chosen from the group consisting of $CH_2$, $C=O$, and O; when $R_1$ and $R_2$ are chosen from the group consisting of $CH_3$ and hydrogen and $R_3$ is hydrogen then X is $CH_2$; when $R_1$ is hydrogen and $R_2$ and $R_3$ are part of a benzo-linkage, then X is $CH_2$. The compound is oxidized in a suitable solvent and in the presence of a catalyst selected from the group consisting of benzyltrimethylammonium hydroxide and benzyltrimethylammonium methoxide, to give a compound having the structure:

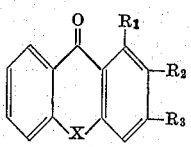

where when $R_1$, $R_2$ and $R_3$ are hydrogen, then X is chosen from the group consisting of $C=O$ and O; when $R_1$ and $R_2$ are chosen from the group consisting of $CH_3$ and hydrogen and $R_3$ is hydrogen then X is $C=O$; when $R_1$ is hydrogen and $R_2$ and $R_3$ are part of a benzo-linkage then X is $C=O$.

Prior methods of oxidizing these compounds required the use of relatively costly oxidizing agents or long reaction times. The present invention utilizes air or oxygen as an inexpensive oxidant. Reaction times are relatively short. A substantial amount of water in proportion to the amount of reactants is actually beneficial in our process.

In the oxidation of 9,10-dihydroanthracene to anthraquinone according to the reaction

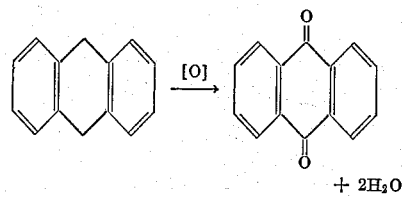
$+ 2H_2O$ the conditions for a typical practice will be described so that subsequently, in describing the effects of changes in the various reaction variables, it will be possible to compare the results obtained with those obtained in the typical practice.

To a solution of 9,10-dihydroanthracene (9.0 g.; 50 millimoles) dissolved in 50 ml. of anhydrous pyridine there was added a pyridine solution (1.7 ml.) of the catalyst, benzyltrimethylammonium hydroxide (3 millimoles.) The solution was heated to between about 50° and 60° C., and oxygen (0.011 s.c.f.m.) was passed into the stirred solution. The heat of the reaction was allowed to increase the temperature to 70° C. A temperature of 70° C. was maintained by external cooling with air for the first 30 minutes. Anthraquinone began to crystallize after about 10 minutes. Heat was applied thereafter to maintain the 70° C. temperature for a total reaction time of 2 hours. The mixture was then cooled to 25° C. The catalyst was neutralized with acetic acid, the solution changing color from red to light yellow. The solvent was evaporated under reduced pressure, the residue washed with water, collected on a filter, and dried. The dried product was assayed for anthraquinone, anthracene, and unreacted 9,10-dihydroanthracene, the results, expressed as percent yield, being respectively 71% anthraquinone, 27% anthracene and 0% 9,10-dihydroanthracene.

Under controlled conditions the above typical practice was repeated, only the named reaction variable being changed. The following results were obtained.

The oxidation of 9,10-dihydroanthracene to anthraquinone may take place over a wide temperature range. The results are as tabulated, the optimum temperature being between about 50° and 70° C.

| Temperature, ° C.: | Percent conversion to anthraquinone |
|---|---|
| −20 | 8 |
| 0 | 10 |
| 30 | 13 |
| 50 | 71 |
| 70 | 70 |
| 90 | 40 |

The temperature need not be held constant. The heat of reaction may be allowed to carry the temperature from ambient temperature to about 80° C. and thence back to ambient temperature, as the heat of reaction is dissipated. In one such experiment the yield was 69% anthraquinone.

Upon varying the molecular ratio of catalyst to 9,10-dihydroanthracene, the results are as tabulated.

| Molecular Ratio of Catalyst to 9,10-dihydroanthracene: | Percent anthraquinone |
|---|---|
| 0.015 | 19 |
| 0.03 | 29 |
| 0.06 | 70 |
| 0.09 | 67 |

The maximum conversion is obtained with a catalyst ratio between about 0.03 and 0.06.

The conversion to anthraquinone decreased from 70% to 45% as the concentration of 9,10-dihydroanthracene was successively doubled from one to two and then from two to four moles per liter of pyridine. These results were probably caused by poor oxygen dispersion at the higher concentrations where anthraquinone, which crystallizes from solution, formed a thick slurry.

Oxygen flow is a reaction variable dependent upon the efficiency of the reaction system in dispersing the gas. Although only 2 moles of oxygen are required for the conversion of 1 mole of 9,10-dihydroanthracene to 1 mole of anthraquinone, it is customary to pass an excess of oxygen or air through the solution. In reaction times of two hours, comparable conversions of about 70% were obtained at flows of 0.011 and 0.04 s.c.f.m., indicating that an excess of oxygen was used even at the lower flow rate. Reaction time at an oxygen flow rate of 0.04 s.c.f.m. and 70° C. temperature was not critical within the ranges one to two and two to three hours. Where advantageous, it is possible to speed up the oxidation appreciably by conducting it under higher oxygen pressures. Thus, for example, when the initial oxygen pressure was about one atmosphere absolute, the reaction was essentially complete in about 20 minutes at a temperature of 70° C. Analysis of the reaction product disclosed a conversion to anthraquinone of 70% and to anthracene of 18%. When the initial oxygen pressure in an autoclave was 58 p.s.i.g. or about five atmospheres absolute, the reaction was essentially complete in about 7 minutes, with a maximum temperature of 55° C. Analysis of the reaction product disclosed a conversion to anthraquinone of 90% and to anthracene of 10%.

Replacing oxygen with carbon-dioxide-free air at a flow rate of 0.011 s.c.f.m. gave a conversion to anthraquinone of 36%. Increasing the air flow to 0.04 s.c.f.m. only increased the conversion to 39%. It was possible to increase the conversion to above 39% as will be explained hereinafter.

Amines other than pyridine have been found effective as solvents for the reactants in the oxidation of 9,10-dihydroanthracene to anthraquinone. The various amines found to be effective solvents and resulting in conversions to anthraquinone of from 15% to 81% may be classified as follows:

AMINES

Heterocyclic:
    Tertiary N—Pyridine; 2, 3, or 4-picolines; quinoline; N-methylmorpholine
    Secondary N—Morpholine; piperidine Aromatic:
    Primary N—Aniline
    Tertiary N—N,N-dimethylaniline Cycloalkyl:
    Primary N—Cyclohexylamine Alkyl:
    Primary N—n-Hexylamine Dibasic:
    N,N-dimethylaminopropylamine Tribasic:
    Diethylenetriamine Other solvents, although less satisfactory than pyridine, but still effective for this autoxidation are nitrobenzene, benzonitrile, acetonitrile, N,N-dimethylformamide and tetrahydrofuran.

While we do not wish to be bound thereby, we believe the autoxidation of 9,10-dihydroanthracene to anthraquinone and some anthracene, involves the reaction of a carbanion and molecular oxygen by means of a one-electron transfer to initiate a free radical mechanism. The free radicals formed in the initiation step would then react with oxygen, itself a diradical, in the propogation steps to determine the nature of the products. The intermediate radicals would be destroyed in the termination phase. Hence, it would apear that all that is required of a solvent is that it be a liquid which dissolves the reactants and is favorable to carbanion formation.

As mentioned above, the reaction tolerates the presence of water. Surprisingly, a substantial amount of water in proportion to the amount of reactants is actually beneficial to our process. When the reaction solvent was 98% by volume aqueous pyridine, the conversion to anthraquinone was 67% compared to 71% in anhydrous pyridine. With 95% and 90% aqueous pyridine, the respective conversions were 87% and 75%. The use of 95% by volume aqueous pyridine as the reaction medium gave the maximum conversion to anthraquinone. Using 95% aqueous pyridine as the reaction solvent and air free of carbon dioxide as the oxidant, the conversion to anthraquinone was increased from 39% to 74%. This again demonstrates the advantage of incorporating the prescribed range of water content in the reaction system.

As to the catalysts, they have been found equally efficient in effecting the oxidation. More surprising, perhaps, than the above-discussed tolerance of the reaction for water is the tolerance for similar quantities of methanol and a combination of water and methanol. This is an important operating advantage, because it permits direct use in the reaction of the commercially available 40% methanolic solution of benzyltrimethylammonium hydioxide or benzyltrimethylammonium methoxide. Hence, when following the above typical practice and keeping all other conditions constant except as specified, the following results were obtained:

| Solvent | Catalyst | Conversion to Anthraquinone, percent |
|---|---|---|
| 95% Aqueous pyridine | Hydroxide catalyst in pyridine. | 87 |
| Do | Hydroxide catalyst in methanol. | 87 |
| 95% Methanolic pyridine | Hydroxide catalyst in pyridine. | 75 |
| Do | Methoxide catalyst in pyridine. | 86 |

The amount of anthraquinone which may be isolated by collection of the crystals in the suspension at the end of a reaction rather than by removal of the solvent was determined. Using 98%, 95% and 90% aqueous pyridine as the solvents, anthraquinone in amounts corresponding to the respective conversions of 64% (80% pure), 84% (98+% pure), and 71% (96% pure) was recovered. In the best test, above 98% of the anthraquinone formed was isolated by direct filtration.

The recycling of the mother liquor after collection of the crystallized anthraquinone was tested. The first reaction was carried out in 95% aqueous pyridine at 70° C. for two hours. The mixture was cooled to 25° C., and the anthraquinone was collected using a pyridine wash (300 ml. per mole of 9,10-dihydroanthracene charged). The mother liquor, including washings, was recycled to 50 millimoles of 9,10-dihydroanthracene. The first recycle did not appear to be producing sufficient anthraquinone, so additional catalyst was added, i.e., in an 0.008 molecular ratio of fresh catalyst to second 9,10-dihydroanthracene charge. Further oxidation appeared to occur, as indicated by a temperature rise. After two hours, the cycle was repeated. In the second recycle even more catalyst (0.06 molecular ratio) was apparently necessary and was added. After removal of the third crystal batch of anthraquinone, the residue in the mother liquor was recovered. The following conversions were obtained; initial test, 85% (97% pure); first recycle, 51% (92% pure); second recycle, 96% (94% pure). The average conversion was 74%. It is thus possible to recycle the mother liquor, but additional catalyst must be added with each recycle. The amount of catalyst needed appears to be of the same order of magnitude as that needed for a single run.

The variations in operating conditions hereinabove discussed may be summarized in the following tabulations and explanation of the important variables, their working ranges and the preferred values:

|  | Broadest Limits Tested | Preferred Values |
|---|---|---|
| Percent Volume of Water in Pyridine | 0 to 10 | 5. |
| Concentration of 9, 10-dihydroanthracene, moles/liter of pyridine | 4 to 1 | 1. |
| Molecular Ratio of Catalyst to 9, 10-Dihydroanthracene | 0.015 to 0.12 | 0.60 |
| Reaction Temperature, ° C | −20 to 90 | 60 to 70. |
| Reaction Time, hours | 0.1 to 3 | 1 to 2. |
| Reaction Pressure, atmospheres, absolute | 1 to 5 | 1 to 5. |

The preferred solvent is 95% aqueous pyridine. The preferred catalysts are benzyltrimethylammonium hydroxide and methoxide as a solution in either pyridine or methanol. It is not necessary to maintain a constant reaction temperature. The temperature should be above 50° C. but not above 70° C. for any large portion of the reaction time, since we have found that the catalyst is subject to thermal degradation. Oxygen is preferred to air as the oxidant, since conversion to anthraquinone is higher, being proportional to the oxygen concentration. If air is employed, carbon dioxide or other acidic gases should be removed, since they react with the catalyst. Water content of the air should not be excessive, since this may cause the water content of the reaction mixture to increase above the preferred value.

Our invention may be used to convert to anthraquinone the 9,10-dihydroanthracene which is a component of creosote or the crude 9,10-dihydroanthracene which may be prepared by selective hydrogenation of an anthracene-containing fraction derived from creosote. A creosote fraction comprising anthracene, phenanthrene and carbazole may be selectively hydrogenated in known manner. For example, according to Corson et al. Patent No. 2,438,148, to convert the anthracene therein to 9,10-dihydroanthracene, the resulting product, or preferably, a suitable fraction thereof which is enriched in 9,10-dihydroanthracene, may be oxidized according to our invention to convert the 9,10-dihydroanthracene to anthraquinone.

A complete understanding of the invention may be obtained from the following typical examples of the process showing how the compounds are made.

*Example 1*

In a reaction flask equipped with a condenser and hollow-bore stirrer, a pyridine solution (1.7 ml.) of benzyltrimethylammonium hydroxide (3 millimoles) is added to a solution of 9,10-dihydroanthracene (9.0 g.; 50 millimoles) in anhydrous pyridine (50 ml.). The molecular ratio of the benzyltrimethylammonium hydroxide catalyst to 9,10-dihydroanthracene is 0.06. Oxygen at a rate of about 0.04 standard cubic feet per minute (s.c.f.m.) is passed into the stirred solution through the hollow bore stirrer for about two hours, the reaction temperature being maintained at about 70° C. After cooling the suspension of product to room temperature, about 1 ml. acetic acid is added to neutralize the basic catalyst. The solvent is removed at about 25 mm. Hg pressure and the solid product is washed with water, collected and dried. The product, upon analysis comprised 70% anthraquinone, 18% anthracene and 12% unreacted starting material.

*Example 2*

In a manner similar to that described in Example 1 a 40% pyridine solution (1.68 ml.) of benzyltrimethylammonium hydroxide (3 millimoles) is added to a solution of 9,10-dihydroanthracene (9.0 g.; 50 millimoles) in 95 volume percent aqueous pyridine (50 ml.). Oxygen at a rate of about 0.011 s.c.f.m. is passed for about two hours into the stirred solution maintained at about 70° C. The cooled product is neutralized with about 1 ml. dilute hydrochloric acid, filtered, washed with water and dried. The product weighed 8.83 g., was 98% pure and represented an 84% conversion of 9,10-dihydroanthracene to anthraquinone. The recovered product represented 98% of the total anthraquinone formed during the oxidation.

*Examples 3–18*

A number of other examples were performed by a method similar to Example 1, changing only the solvent. The results are set forth in Table 1.

TABLE 1

| Ex. | Solvent | Conversion to Anthraquinone | | Conversion to Anthracene, percent | 9, 10-Dihydroanthracene Unreacted, percent |
|---|---|---|---|---|---|
| | | Conversion, percent | Yield, percent | | |
| 3 | 95% Aqueous Pyridine | 85 | 85 | 15 | 0 |
| 4 | N,N-Dimethylaniline | 31 | 77 | 13 | 60 |
| 5 | Aniline | 81 | 81 | 20 | 0 |
| 6 | Morpholine | 54 | 59 | 37 | 8 |
| 7 | N-Methylmorpholine | 53 | 64 | 33 | 14 |
| 8 | Quinoline | 15 | 52 | 13 | 71 |
| 9 | N,N-Dimethylaminopropylamine | 74 | 74 | 26 | 0 |
| 10 | Diethylenetriamine | 43 | 44 | 55 | 1 |
| 11 | Cyclohexylamine | 59 | 59 | 40 | 0 |
| 12 | n-Hexylamine | 65 | 65 | 35 | 0 |
| 13 | Acetonitrile | 15 | 79 | 3 | 81 |
| 14 | 2-Picoline | 52 | 52 | 46 | 0 |
| 15 | 3-Picoline | 59 | 59 | 39 | 0 |
| 16 | 4-Picoline | 60 | 60 | 36 | 0 |
| 17 | Piperidine | 47 | 47 | 41 | 0 |
| 18 | N,N-Dimethylformamide | 14 | 99 | 3 | 87 |

*Example 19*

A creosote fraction comprising about 19% anthracene, 50% phenanthrene and 4% carbazole was selectively hydrogenated in known manner, to convert anthracene to 9,10-dihydroanthracene. The resulting product was progressively fractionated to obtain fractions comprising increasing quantities of 9,10-dihydroanthracene. These fractions and a synthetic mixture of 50% 9,10-dihydroanthracene and 50% phenanthrene were oxidized in accordance with the method described in Example 2, except the catalyst was added as a methanolic solution. Table 2 sets forth the analysis of the hydrogenated fractions and the conversion to anthraquione from each.

TABLE 2.—COMPOSITION OF MATERIAL BEING OXIDIZED

| | 9,10-Dihydroanthracene, percent | Phenanthrene, percent | Other Impurities, percent | Conversion to Anthraquinone, percent |
|---|---|---|---|---|
| (1) | 29 | 54 | 17 | 58 |
| (2) | 76 | 18 | 6 | 87 |
| (3) | 80 | 12 | 8 | 87 |
| (4) | 91 | 2 | 7 | 83 |
| (5) | Synthetic mixture of 50% 9,10-dihydroanthracene and 50% phenanthrene. | | | 80 |

*Example 20.—Oxidation of Anthrone to Anthraquinone*

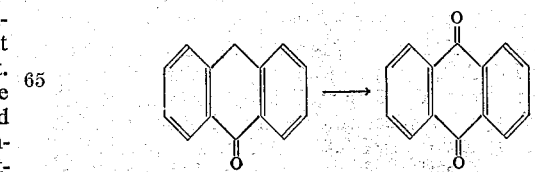

Anthrone (3.96 g.; 20 millimoles) was suspended in anhydrous pyridine (50 ml.) at 30° C. A solution (0.7 ml.) of benzyltrimethylammonium hydroxide (1.2 millimoles) in pyridine was added, and the mixture was heated to 70° C. to bring the anthrone into solution. Oxygen was passed into the stirred solution at a flow rate of 0.007 s.c.f.m. At the end of two hours, the reaction mixture, containing crystals of anthraquinone, was cooled and acetic acid (0.5 ml.) was added. The solvent was removed by reduced-pressure distillation and the residue collected, washed with water, and dried in vacuo. The product, weighing 4.055 g. assayed 40% anthraquinone for a 39% conversion.

*Example 21.—Oxidation of Xanthene to Xanthone (9-Xanthenone)*

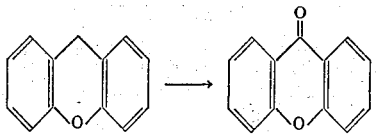

A pyridine solution (1.70 ml.) of benzyltrimethylammonium hydroxide (3 millimoles) was added to a solution of xanthene (9.11 g.; 50 millimoles) in anhydrous pyridine (50 ml.). Oxygen (0.011 s.c.f.m.) was passed into the stirred solution at 50° C. for one hour. At the end of an hour, the mixture was cooled to 25° C. and hydrochloric acid ( 1 ml.; 1 part concentrated acid: 9 parts water) was added. The crystals of xanthone which were collected weighed 4.675 g. (48% conversion) and melted in the range 173.5° to 174.5° C. (literature, 173°–174° C.). The solvent was removed from the mother liquor, and the residue, after washing with water and drying, weighed 4.980 g. (M.P. 90°–150° C.). Recrystallization from benzene gave xanthone (2.143 g.; M.P. 169°–172° C.). The residue contained in the mother liquor was recrystallized from n-heptane to give 1.00 g. of less-pure xanthone (M.P. 156°–168° C.). Total conversion to xanthone was 78%. The residue from the n-heptane mother liquor was recrystallized from ethanol (95%) to give 1.28 g. of unreacted xanthene. Based on the xanthene reacted, the total yield of xanthone was 93%.

*Example 22.—Oxidation of 5,12-Dihydrotetracene to 5,12-Tetracenequinone*

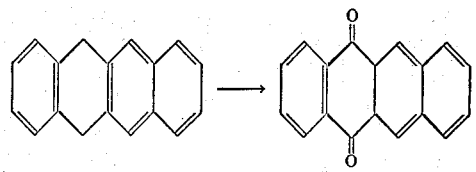

Oxygen was passed for 30 minutes through a solution of 5,12-dihydrotetracene (0.5 g.; 2.2 millimoles) in anhydrous pyridine (50 ml.) containing about 1.6 millimoles of benzyltrimethylammonium hydroxide. Half of the pyridine was evaporated, and the remaining solution was poured into an excess of water. The solid precipitate (0.48 g.), after being collected, washed, and dried, was recrystallized from acetic acid to give 0.22 g. (39% conversion) of 5,12-tetracenequinone melting at 290°–293° C. (literature, 292°–293° C.). The remainder of the material was tetracene.

*Example 23.—Oxidation of 1-Methyl-9,10-Dihydroanthracene to 1-Methylanthraquinone*

The 1-methyl-9,10-dihydroanthracene (9.7 g.; 50 millimoles) was dissolved in 95 percent aqueous pyridine and heated to 70° C. A solution (1.6 ml.) of benzyltrimethylammonium hydroxide (3.56 millimoles) in methanol was added. Oxygen was passed into the vigorously stirred solution at a flow rate of 0.011 s.c.f.m. At the end of 1.5 hours, the reaction mixture was cooled to room temperature, and dilute (4% aqueous) hydrochloric acid (2.0 ml.) was added. The solvent was removed by flash evaporation. The residue was collected, washed thoroughly with water, and dried in vacuo. The conversion to 1-methylanthraquinone, as determined by alkaline sodium hydrosulfite extraction of the reaction residue and oxidation of the resulting anthrahydroquinone salt back to the quinone, was 30%. The product melted at 163° to 167° C.

*Example 24.—Oxidation of 2-Methyl-9,10-Dihydroanthracene to 2-Methylanthraquinone*

Example 23 was repeated, except that 2-methyl-9,10-dihydroanthracene was substituted for 1-methyl-9,10-dihydroanthracene. 2-methylanthraquinone was obtained in 35% conversion. The product recovered by alkaline sodium hydrosulfite extraction melted at 165° to 169° C.

While the above examples illustrate preferred methods of operation, other conditions of operation may be used without departing from the spirit of the invention.

The oxidation process may be used to prepare substituted anthraquinones, xanthones, and tetracenequinones. For example, alkylation, acylation, halogenation, or any of the usual electrophilic substitution reactions of 9,10-dihydroanthracene should yield substituted 9,10-dihydroanthracenes which, on oxidation by the process of this invention, yield substituted anthraquinones.

Although we have disclosed herein the preferred practice of our invention, we intend to cover as well any change or modification therein which may be made without departing from the spirit and scope of the invention.

We claim:

1. A process for the oxidation of partially hydrogenated polycyclic aromatic and heterocyclic compounds having the structure:

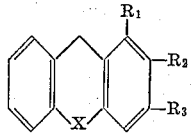

where when $R_1$, $R_2$ and $R_3$ are hydrogen, then X is chosen from the group consisting of $CH_2$, C=O and O, when $R_1$ and $R_2$ are chosen from the group consisting of $CH_3$ and hydrogen and $R_3$ is hydrogen then X is $CH_2$, and when $R_1$ is hydrogen and $R_2$ and $R_3$ are part of a benzo-linkage, then X is $CH_2$, comprising dissolving said compound in a solvent favorable to carbanion formation, containing a catalyst chosen from the group consisting of benzyltrimethylammonium hydroxide and benzyltrimethylammonium methoxide, contacting the solution with an acid-free, oxygen-containing gas and recovering a product having the structure:

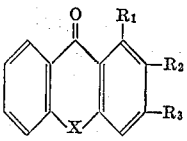

where when $R_1$, $R_2$ and $R_3$ are hydrogen, then X is chosen from the group consisting of C=O and O, when $R_1$ and $R_2$ are chosen from the group consisting of $CH_3$ and hydrogen and $R_3$ is hydrogen then X is C=O, and when $R_1$ is hydrogen and $R_2$ and $R_3$ are part of a benzo-linkage, then X is C=O.

2. A process as described in claim 1 characterized by said solvent being an amine.

3. A process as described in claim 2 characterized by said amine being chosen from the group consisting of aniline, cyclohexylamine, diethylenetriamine, N,N-dimethylaminopropylamine, N,N-dimethylaniline, n-hexylamine, N-methylmorpholine, morpholine, 2-picoline, 3-picoline, 4-picoline, piperidine, pyridine and quinoline.

4. A process as described in claim 1 characterized by oxidizing 9,10-dihydroanthracene to anthraquinone.

5. A process as described in claim 4 characterized by oxidizing a product of the step of hydrogenating catalytically an anthracene-containing, coal-tar fraction to convert anthracene to 9,10-dihydroanthracene.

6. A process as described in claim 1 characterized by oxidizing anthrone to anthraquinone.

7. A process as described in claim 1 characterized by oxidizing xanthene to xanthone.

8. A process as described in claim 1 characterized by oxidizing 5,12-dihydrotetracene to 5,12-tetracenequinone.

9. A process as described in claim 1, characterized by dissolving said compound in pyridine containing said catalyst in a molecular ratio to said compound between about 0.015 and 0.09.

10. A process as described in claim 9, characterized by recovering reaction product by filtration, mixing and filtrate with additional quantities of said catalyst and compound in said molecular ratio and repeating the process.

11. A process as described in claim 1, characterized by dissolving said compound in pyridine containing from zero to about ten volume percent of a composition chosen from the group consisting of water, methanol, and a combination thereof and contacting the solution with oxygen while maintaining a reaction temperature between about 50° C. and 70° C.

12. A process for the oxidation of 9,10-dihydroanthracene to anthraquinone comprising dissolving 9,10-dihydroanthracene in a ratio of about one mole thereof to a liter of pyridine containing about five volume percent water and containing a catalyst in a molecular ratio to the 9,10-dihydroanthracene between about 0.015 and 0.09 chosen from the group consisting of benzyltrimethylammonium hydroxide and benzyltrimethylammonium methoxide, passing oxygen through said solution while maintaining a reaction temperature between about −20° C. and 90° C. and recovering anthraquinone.

No references cited.

UNITED STATES PATENT OFFICE
CERTIFICATE OF CORRECTION

Patent No. 3,163,657 December 29, 1964

Marcus S. Morgan et al.

It is hereby certified that error appears in the above numbered patent requiring correction and that the said Letters Patent should read as corrected below.

Column 5, in the table, under the heading "Preferred Values", line 3 thereof, for "0.60" read -- 0.06 --.

Signed and sealed this 4th day of May 1965.

(SEAL)
Attest:

ERNEST W. SWIDER
Attesting Officer

EDWARD J. BRENNER
Commissioner of Patents